(12) United States Patent
Peter (10) Patent No.: US 11,904,707 B2
(45) Date of Patent: Feb. 20, 2024

(54) RAIL TRANSPORT VEHICLE ELECTRIC ENERGY STORAGE AND CHARGING SYSTEM

(71) Applicant: First Greater Western Limited, Swindon (GB)

(72) Inventor: Mason Peter, Southam (GB)

(73) Assignee: First Greater Western Limited, Swindon (GB)

( * ) Notice: Subject to any disclaimer, the term of this patent is extended or adjusted under 35 U.S.C. 154(b) by 296 days.

(21) Appl. No.: 15/733,923

(22) PCT Filed: Jun. 3, 2019

(86) PCT No.: PCT/GB2019/051531
§ 371 (c)(1),
(2) Date: Dec. 1, 2020

(87) PCT Pub. No.: WO2019/229479
PCT Pub. Date: Dec. 5, 2019

(65) Prior Publication Data
US 2021/0221245 A1    Jul. 22, 2021

(30) Foreign Application Priority Data

Jun. 1, 2018    (GB) .................................... 1809019

(51) Int. Cl.
*B60L 5/39* (2006.01)
*B60L 53/53* (2019.01)
(Continued)

(52) U.S. Cl.
CPC .................... *B60L 5/39* (2013.01);
*B60L 5/38* (2013.01); *B60L 5/42* (2013.01);
*B60L 53/30* (2019.02);
(Continued)

(58) Field of Classification Search
CPC ...... B60L 5/39; B60L 5/38; B60L 5/42; B60L 53/30; B60L 53/32; B60M 1/30;
(Continued)

(56) References Cited

U.S. PATENT DOCUMENTS

| 3,906,866 A | 9/1975 | Knippel |
| 6,250,442 B1 | 6/2001 | Perraud et al. |

(Continued)

FOREIGN PATENT DOCUMENTS

| CN | 1557663 A | * 12/2004 |
| CN | 101774355 A | * 7/2010 |

(Continued)

OTHER PUBLICATIONS

Australian Government, Examination Report for App. No. 2016305563, dated Feb. 28, 2020, 7 pgs.
(Continued)

*Primary Examiner* — Naum Levin
(74) *Attorney, Agent, or Firm* — Cognition IP, P.C.; Edward Steakley (57) ABSTRACT

According to some embodiments, a rail transport vehicle electric energy storage and charging system is presented. The system may include an energy storage sub-system and a charging system having a charging rail which only charges a vehicle when the rail is covered. The system may also include a battery-powered rail vehicle having a rail-contacting charging shoe.

19 Claims, 9 Drawing Sheets (51) Int. Cl.
  *B60L 53/30* (2019.01)
  *B60L 5/42* (2006.01)
  *B60M 1/30* (2006.01)
  *B60M 1/36* (2006.01)
  *B60M 7/00* (2006.01)
  *B60L 5/38* (2006.01)

(52) U.S. Cl.
  CPC ............ *B60L 53/53* (2019.02); *B60M 1/30* (2013.01); *B60M 1/36* (2013.01); *B60M 7/003* (2013.01); *B60L 2200/26* (2013.01)

(58) Field of Classification Search
  CPC .......... B60M 1/36; B60M 7/003; B60M 3/04; Y02T 10/92
  See application file for complete search history.

(56) References Cited

U.S. PATENT DOCUMENTS

| | | | | |
|---|---|---|---|---|
| 7,932,625 | B2 * | 4/2011 | Vienney | B60M 3/04 307/9.1 |
| 8,319,474 | B2 * | 11/2012 | Mitake | H02J 50/80 320/108 |
| 9,365,128 | B2 * | 6/2016 | Sarkar | B60L 5/42 |
| 9,946,906 | B2 * | 4/2018 | Ricci | B60L 50/53 |
| 10,150,524 | B2 * | 12/2018 | Evans | B62D 27/06 |
| 10,286,925 | B2 * | 5/2019 | Evans | B61B 13/00 |
| 10,500,978 | B2 * | 12/2019 | Hourtane | B60L 5/42 |
| 10,696,174 | B2 * | 6/2020 | McGrath | B60L 7/12 |
| 10,744,894 | B2 * | 8/2020 | Greyson | B60L 53/14 |
| 10,899,240 | B2 * | 1/2021 | Evans | B64C 39/024 |
| 2001/0052433 | A1 | 12/2001 | Harris et al. | |
| 2004/0157117 | A1 | 8/2004 | Tamaki et al. | |
| 2006/0144887 | A1 | 7/2006 | Czernietzki | |
| 2007/0278059 | A1 * | 12/2007 | Afriat | B60M 3/06 191/29 R |
| 2008/0196758 | A1 | 8/2008 | McGuire | |
| 2010/0212539 | A1 | 8/2010 | Iden | |
| 2011/0050167 | A1 | 3/2011 | Kissel, Jr. | |
| 2011/0234070 | A1 | 9/2011 | Kataoka et al. | |
| 2013/0328530 | A1 | 12/2013 | Beaston | |
| 2014/0148965 | A1 | 5/2014 | Epstein et al. | |
| 2014/0239879 | A1 | 8/2014 | Madsen | |
| 2014/0318410 | A1 | 10/2014 | Kral et al. | |
| 2016/0082850 | A1 | 3/2016 | Yamasaki et al. | |
| 2016/0167530 | A1 * | 6/2016 | Bolik | B60L 53/65 320/108 |
| 2017/0237372 | A1 | 8/2017 | Jalla | |
| 2017/0282945 | A1 | 10/2017 | Hourtane et al. | |
| 2018/0141452 | A1 | 5/2018 | Hourtane et al. | |
| 2018/0237037 | A1 | 8/2018 | Shooter | |

FOREIGN PATENT DOCUMENTS

| | | | | |
|---|---|---|---|---|
| CN | 105946626 | A * | 9/2016 | |
| CN | 107031438 | A * | 8/2017 | |
| CN | 107394855 | A * | 11/2017 | |
| CN | 107444190 | A * | 12/2017 | |
| CN | 107709083 | A * | 2/2018 | ................ B60L 5/42 |
| CN | 107804174 | A * | 3/2018 | ................ B60L 5/39 |
| CN | 207190835 | U | 4/2018 | |
| CN | 108367683 | A * | 8/2018 | ............ B60L 3/0015 |
| CN | 208216537 | U * | 12/2018 | |
| CN | 111301190 | A * | 6/2020 | .............. B60L 53/14 |
| CN | 110303904 | B * | 4/2021 | ................ B60L 5/00 |
| DE | 9110143 | U1 | 10/1991 | |
| DE | 4119245 | A1 * | 12/1992 | |
| DE | 29620865 | U1 | 2/1997 | |
| DE | 102011110641 | A1 | 2/2013 | |
| DE | 102011115570 | A1 | 4/2013 | |
| DE | 102015215178 | A1 * | 2/2017 | |
| DE | 202018100581 | U1 | 3/2018 | |
| EP | 1043187 | A1 | 10/2000 | |
| EP | 1186497 | A1 | 3/2002 | |
| EP | 1725424 | B2 | 11/2006 | |
| EP | 1675197 | A1 | 5/2008 | |
| EP | 2277761 | A2 | 1/2011 | |
| EP | 2689953 | A1 | 1/2014 | |
| EP | 3354510 | B1 * | 9/2021 | ................ B60L 5/40 |
| FR | 2866607 | A1 | 8/2005 | |
| FR | 3037195 | A1 * | 12/2016 | ................ B60L 5/42 |
| FR | 3048387 | A1 | 9/2017 | |
| GB | 190224742 | A | 5/1903 | |
| GB | 2541258 | A * | 2/2017 | ............. B61C 17/06 |
| GB | 2549489 | A | 10/2017 | |
| KR | 101020406 | B1 | 3/2011 | |
| KR | 20120109723 | A | 10/2012 | |
| KR | 20130056494 | A | 5/2013 | |
| KR | 20160138114 | A * | 12/2016 | |
| WO | 0046065 | A1 | 8/2000 | |
| WO | WO-2008105434 | A1 * | 9/2008 | ................ B60L 5/42 |
| WO | WO-2010076976 | A2 * | 7/2010 | .......... B60L 11/1816 |
| WO | 2012095596 | A1 | 7/2012 | |
| WO | WO-2016198465 | A1 * | 12/2016 | ................ B60L 5/42 |

OTHER PUBLICATIONS

Intellectual Property Office of the United Kingdom; Search Report for GB Application No. 1809019.1; dated Apr. 26, 2019; 3 pages.
Intellectual Property Office of the United Kingdom; Search Report for GB Application No. 1809019.1; dated Nov. 29, 2018; 4 pages.
Intellectual Property Office of the United Kingdom; Search Report of GB Application No. GB1606757.1; which is in the same family as PCT/GB2016/052494; dated Sep. 26, 2016; 5 pgs.
International Searching Authority; International Search Report for International Application No. PCT/GB2019/051531; dated Nov. 18, 2019; 6 pages.
International Searching Authority; International Search Report of International Application No. PCT/GB2016/052494; dated Nov. 15, 2016; 4 pgs.
International Searching Authority; Written Opinion of the Searching Authority for International App. No. PCT/GB2016/052494; dated Nov. 15, 2016; 5 pages.
International Searching Authority; Written Opinion of the Searching Authority for International Application No. PCT/GB2019/051531; dated Nov. 18, 2019; 12 pages.
United States Patent and Trademark Office; Final Office Action for U.S. Appl. No. 15/751,768; dated Jun. 16, 2020; 6 pages.
United States Patent and Trademark Office; Notice of Allowance for U.S. Appl. No. 15/751,768; dated Oct. 2, 2020; 8 pages.
United States Patent and Trademark Office; Non-Final Office Action for U.S. Appl. No. 15/751,768; dated Mar. 16, 2020; 6 pages.

* cited by examiner

RAIL TRANSPORT VEHICLE ELECTRIC ENERGY STORAGE AND CHARGING SYSTEM

CROSS-REFERENCE TO RELATED APPLICATIONS

This application is a National Stage of PCT Application No. PCT/GB2019/051531 filed on Jun. 3, 2019 which claims the benefit of and priority to Great Britain Patent Application No. 1809019.1 filed on Jun. 1, 2018, each of which is incorporated herein by reference in their entireties.

FIELD OF THE DISCLOSURE

The presently disclosed embodiments relate to a rail transport vehicle electric energy storage and charging system. More specifically, the presently disclosed embodiments relate to an energy storage and charging system for charging the battery used to provide locomotive power on-board an electric rail passenger carriage.

BACKGROUND OF THE DISCLOSURE

Delays to the national electrification program in the UK in particular have increased demand for autonomous ("self-propelled") railway carriages, for example the Vivarail™ Class 230 DEMU. The Class 230 DEMU is a rebuild based on the bodyshell and bogies of the former LUL D78 District Line trains.

The Class 230 is a self-propelled Electric Multiple Unit (EMU). The term "self-propelled" in this disclosure may be understood to mean that the means of propulsion, or power source, is contained on board the unit. The unit is propelled by axle mounted traction motors that are controlled by a package of traction electronics. Those traction electronics rely on a 500 to 750V DC feed from a suitable power source. This can be one of, or a mixture of, diesel generators, battery packs or a fuel cell. The applicant's previous patent application WO2017/025751 (incorporated herein by reference where permitted) provides details of the kind of modular system which can be implemented to allow the Class 230 to be powered by a variety of power sources, including a battery or array of batteries. It will be noted that there is also a market for railway vehicles of this type outside the UK.

A problem with using batteries as the primary or sole locomotive power source on trains is the inherent limitation on range (assuming the line is not electrified). At current battery technology levels, the range of battery-powered trains would likely be limited to a distance less than the required travel time during the course of a day.

Therefore, there is a need to replace the batteries during the course of the day's running. The applicant's previous patent application WO2017/025751 discloses an apparatus and method for replacing battery modules, but this requires some degree of expertise and manual intervention which may not be desirable at a railway station.

It is desirable to be able to recharge the batteries on-board the carriages. This is problematic in the UK because of limitations imposed by the ORR (the Office of Road and Rail—the Health and Safety regulatory body for railways), which state that at no time should exposed conductors providing the charging supply be accessible to passengers or the general public. It is also problematic for the existing infrastructure. Existing electricity supplies are typically not capable of delivering the power levels required to charge a train battery in an adequate time period.

Accordingly, there is a need for a rail transport vehicle charging system that is fully coverable by a train carriage and able to recharge a train unit in an adequate time period. It is an aim of the presently disclosed embodiment to overcome, or at least mitigate, the above problems.

BRIEF DESCRIPTION OF THE EXEMPLARY EMBODIMENTS

According to an aspect, the exemplary embodiments include a rail electric power storage system for recharging battery powered rail units including a stationary battery, a power input configured to charge the stationary battery at a first power level, a power output configured to discharge the stationary battery at a second power level that is higher than the first power level and a charging apparatus for electrically connecting the power output to a battery powered train to charge a battery of the battery powered train.

In an aspect, this allows a standard power supply to be used at e.g. any available mains supply, typically 240V, 415V, 11 kV, 33 kV AC. The supply can continuously charge the battery for higher-power discharging to the train battery.

In an aspect, the power input may be connected to mains power and/or to an alternative power source such as PV panels or a wind turbine.

In an aspect, the power input is configured to continuously charge the stationary battery. By "continuously" we mean through the majority of the day—i.e. at least 20 hours out of 24. The battery may be charged during times when electricity is less expensive.

In an aspect, the power input is configured to charge the stationary battery at a low charge power, including being configured to trickle charge the stationary battery.

In an aspect, the stationary battery comprises a container storing at least one battery. In an aspect, there are provided a number of batteries provided in a battery group or array, in which the container is a shipping container. This allows for easy replacement of the battery or batteries.

In another aspect, the exemplary embodiments include a rail transport vehicle charging system including a charging rail dimensioned to be fully coverable by a train carriage, a power supply for charging an electric train battery, the power supply being configured to selectively supply a charging current to the charging rail, and a sensor apparatus configured to detect the position and/or movement of a train carriage over the charging rail. The sensor may be connected to the power supply such that the charging current is only supplied to the charging rail when the train carriage at least partially covers the charging rail.

In an aspect, this allows for simple charging (the train has a contact for the charging rail) and a high degree of safety, as unlike with known electrified lines, the line is only live when covered by the train.

In an aspect, the charging current is only supplied to the charging rail when the train carriage fully covers the charging rail.

In an aspect, the sensor is configured to detect a circuit being made with the charging rail, and to apply the charging current upon detection of the circuit being made.

In an aspect, a sensing electrical potential may be applied to the charging rail, in which the sensor is configured to detect a sensing current flowing as a result of the sensing electrical potential.

In an aspect, the sensing current may be AC and the charging current may be DC.

In an aspect, the sensor may be configured to detect the presence of a train carriage over the charging rail. The sensor in an embodiment may be an optical sensor. In a further embodiment, the sensor may be an electromechanical sensor.

In an aspect, a combination of two sensors as discussed above may be provided for backup/redundancy.

In an aspect, the system comprises a plurality of discrete charging rails configured to simultaneously charge a plurality of train carriages.

In an aspect, each discrete charging rail comprises a respective sensor apparatus configured to detect the position and/or movement of a respective train carriage over the charging rail, and in which each sensor apparatus is connected to a power supply such that the charging current is only supplied to the respective charging rail when a respective train carriage at least partially covers the respective charging rail.

In an aspect, the power supply is common to the plurality of charging rails.

In an aspect, the charging rail is positioned between two running rails.

In an aspect, there is a further or second charging rail configured to make the charging circuit with the charging rail.

In an aspect, the further charging rail is connected to earth potential.

In an aspect, the further charging rail is positioned outside of the running rails. Preferably the system is configured per the London Underground (LU) four rail specification in terms of rail spacing. This allows LU vehicles to be easily adapted for use with the system.

In an aspect, there is provided a rail transport vehicle having an on-board battery arranged to be charged by the rail transport vehicle charging system, in which the rail transport vehicle comprises an electrical contact for contact with the charging rail. The contact may be a shoe.

In an aspect, the sensor apparatus may be on-board the rail transport vehicle. It may be configured to detect electrical connection between the electrical contact and the charging rail or configured to detect motion of the rail transport vehicle. The sensor apparatus may be configured to detect a driver input of the rail transport vehicle.

The disclosed embodiment provides a rail transport vehicle electric energy storage and charging system comprising an electric energy storage according to the first aspect and a charging system according to the second aspect.

In another aspect, the exemplary embodiments include an electric rail transport vehicle comprising an electric motor for propelling the vehicle, a battery arranged to power the electric motor and a rail contact electrode extending from the vehicle and configured to contact a rail, in which the rail contact electrode is connected to the battery to provide a charging current from the rail to the battery in use.

BRIEF DESCRIPTION OF THE FIGURES

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to emphasize specific features relevant to some exemplary embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various exemplary embodiments. Each example is provided by way of explanation and is not meant as a limitation and does not constitute a definition of all possible embodiments.

For purposes of this disclosure, the term "electric train carriage" may be understood to mean a train carriage which is arranged to be driven by an electric motor. An electric motor of the electric train carriage may be supplied with power from a battery via traction electronics. For purposes of this disclosure, the term "rail" may be understood to mean an elongate structure positioned below the vehicle, either directly below or below and to the side of the vehicle. For purposes of this disclosure, a rail contact electrode or "shoe" may extend downwardly between the wheels on either side of the vehicle, or on one side of the wheels.

For purposes of illustrating features of the embodiments, an exemplary embodiment will now be introduced and referenced throughout the disclosure. It will be understood that this example and other exemplary embodiments described in this disclosure are illustrative and not limiting and are provided for illustrating the exemplary features of a furniture item equipped with an electric train carriage.

Figure 1:
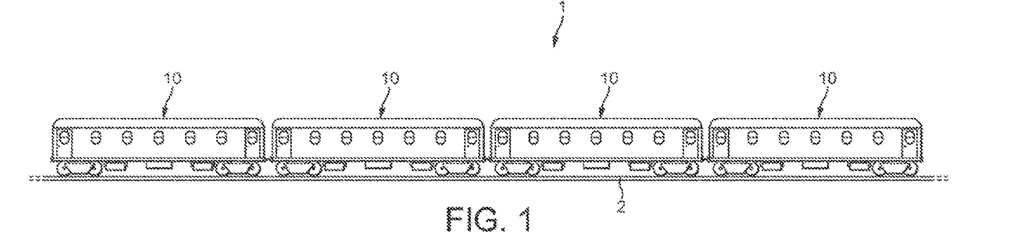
FIG. 1 is a train comprising a number of carriages.

FIG. 1 shows a four-carriage electric rail train 1, for running on a set of rails 2. The train is very similar to that described in WO2017/025751. The train 1 comprises a plurality of electric train carriages 10, each in the form of a self-propelled train carriage. The train 1 may therefore be referred to as a multiple unit. In this arrangement only two of the four carriages 10 are self-propelled (i.e. powered). However, it should be appreciated that there may be any suitable number of carriages, and any number of them may be self-powered. For example, a train 1 may comprise four carriages, only two of which may be motorized. In this aspect of the disclosed embodiment, the front and rear carriages 10 are provided with a control cab from which the train 1 can be controlled.

Figure 2:
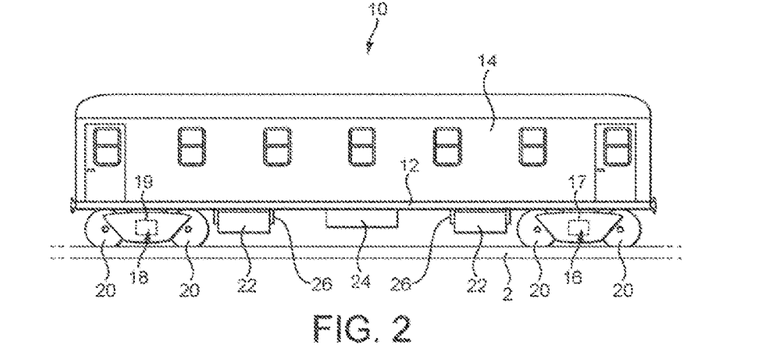
FIG. 2 is a single powered train carriage.

FIG. 2 shows a single train carriage 10 which may be referred to as a multiple unit. The carriage 10 comprises a main chassis or frame 12 and a carriage body 14 assembled as a monocoque. Mounted to the underneath of the main chassis 12 are front and rear bogies 16, 18, each having four wheels 20. Two electric motors 17, 19 are mounted to each bogie 16, 18 and are arranged to drive the wheels 20 of the respective bogie 16, 18. As will be explained in detail below, the electric motors are arranged to be powered by two on-board electric power modules 22 that are removably attached to the chassis 12 and which contain batteries.

Each powered carriage 10 also comprises two power module bays 26, one for each power module 22. The power module bays 26 are attached to the underside of the chassis 12, or are defined by the underneath of the chassis 12, and are configured such that the power module 22 can be removably located and secured therein. With the electric power module 22 located and secured within a power module bay 26, the power module 22 is supported underneath the main chassis 12. The electric power module 22 can be quickly and easily replaced since it is removably located and secured within the power module bay 26. In this aspect of the disclosed embodiment, and as will be described in detail below, the power module 22 can be inserted into the power module bay 26 from the side of the carriage 10 by moving the power module 22 in a horizontal direction that is transverse to the longitudinal axis of the carriage 10. The power module 22 can be inserted into and removed from a power module bay 26 without requiring access to the underside of the carriage, and without requiring the carriage to be lifted. This allows the power module 22 of a carriage 10 to be replaced in a remote location, without having to access the underneath of the carriage, which would require either lifting equipment or an inspection pit.

The train carriage 10 is configured such that it can be powered by a number of different types of compatible and interchangeable electric power modules 22, each type providing electric power utilizing a different method. For the purposes of the presently disclosed embodiment, the power modules are battery modules.

Figure 3:
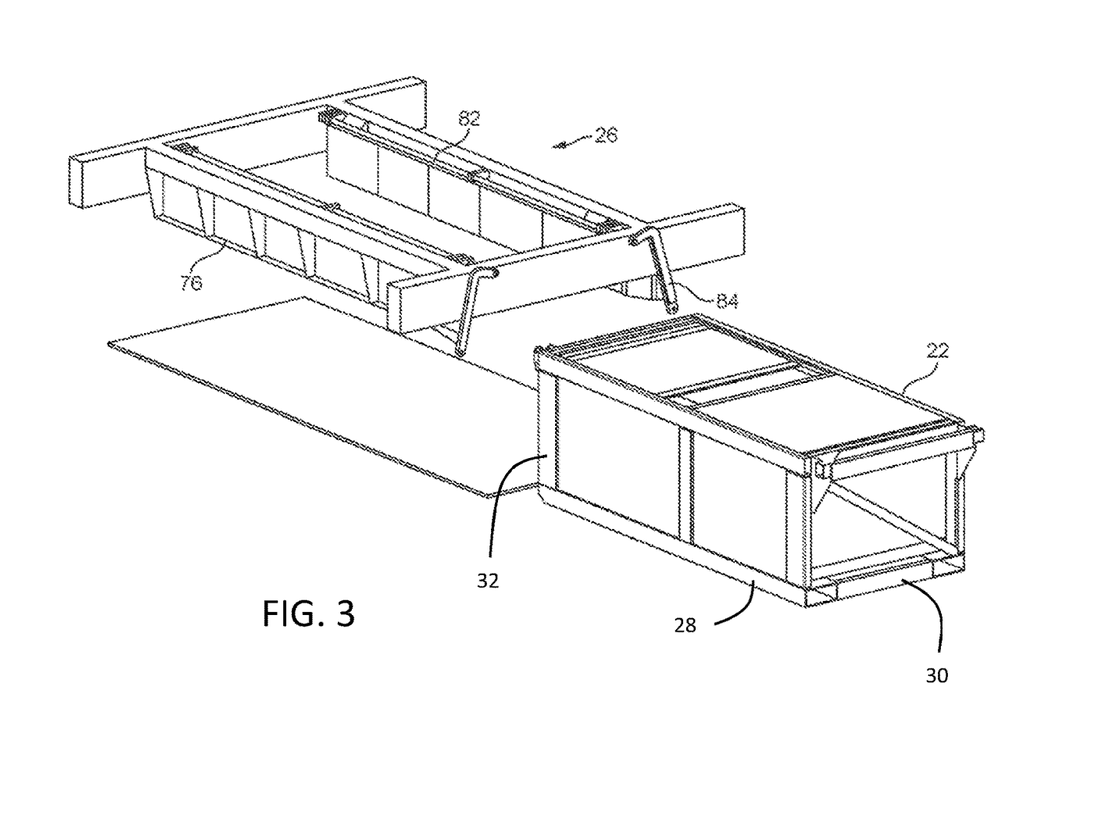
FIG. 3 shows a power module being inserted into a power module bay of the train carriage of FIG. 2.

FIG. 3 shows a power module 22 which can be located within a power module bay 26. The power module 22 shown in FIG. 3 is a battery power module 22. The power module 22 is generally cuboidal and comprises a main structural support frame 28 that defines a cuboidal package. In this aspect of the disclosed embodiment, the power module 22 has a front end 30 and a rear end 32 and is of a length that is greater than the width.

The power module 22 comprises an electrical connector for connecting external components (specifically the electric motors on the train) to the power module 22. In an aspect, there may also be an electrical connector for a safety earth cable. This may be a bolted connection.

The power module bay 26 comprises a securing mechanism having two parallel rods 82 driven by actuator handles 84 which can be manually actuated to secure and release the module 22 as described in WO2017/025751.

Figure 4:
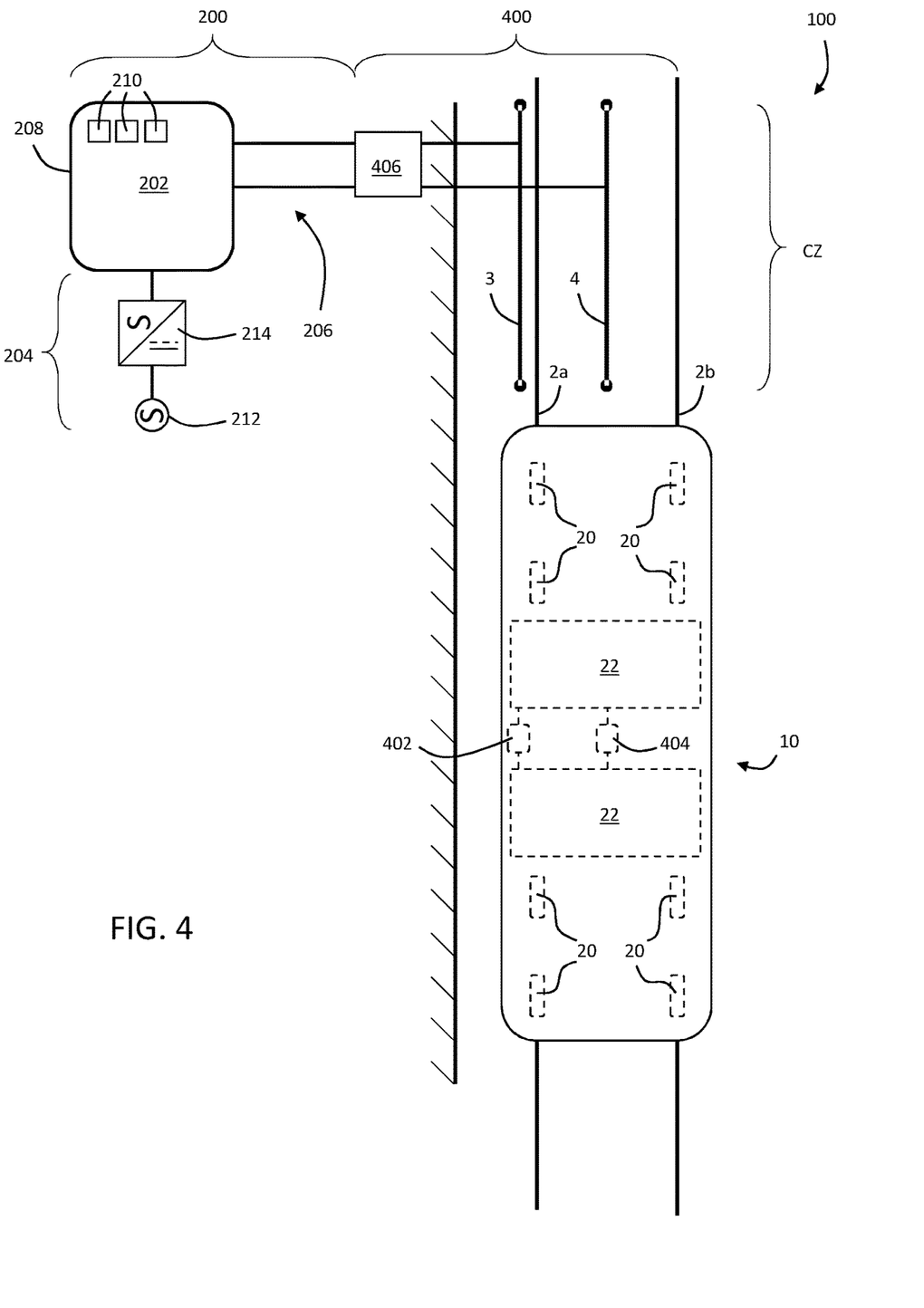
FIG. 4 is a schematic of a first rail transport vehicle electric energy storage and charging system.

An energy storage and charging system 100 according to the presently disclosed embodiment is shown in FIG. 4. The system 100 may comprises an energy storage apparatus 200 and a charging apparatus 400.

In an exemplary embodiment, the energy storage apparatus 200 may comprise a battery array 202, a power input 204 and a power output 206. In an aspect, the battery array 202 comprises a battery container 208 containing an array of individual batteries 210. The battery array is typically large in size and power capacity- and the container in this aspect of the disclosed embodiment may be a standard size shipping container. The array has a power capacity in the order of 5 MWh.

The power input 204 comprises an AC source 212 (such as single- or three-phase mains power) connected to a power converter 214 comprising a rectifier. The power converter 214 is configured to constantly charge the cells 210 of the array 202, which may be described as "trickle" charging. This allows large amounts of energy to be stored in the battery array 202 to enable fast charging of train batteries via the charging system 400 described below via the power output 206.

In an aspect, the energy storage apparatus 200 may be located at a railway station and powered from the existing infrastructure. The charging system 100 according to the presently disclosed embodiment is based on a four-rail system. Generally, on a non-electrified railway there is the set of rails 2 as described above comprising a first rail 2a and a second rail 2b (FIG. 4). The two running rails 2a, 2b are contacted by the wheels 20 of the carriages 10 during motion.

According to the charging system 400, a third rail 3 and a fourth rail 4 are provided. The third and fourth rails 3, 4 are parallel to the running rails 2a, 2b. The third rail 3 is adjacent to the first rail 2a but outside of the rails 2a, 2b. The fourth rail 4 is between the first and second rails 2a, 2b.

The third and fourth rails 3, 4 do not extend the length of the railway, and are positioned only in a charging zone CZ which may be e.g. adjacent a railway station at the end of a branch line. The length of the third and fourth rails 3, 4 (i.e. the size of the charging zone CZ) is predetermined, and may be selected to be less than the shortest train to be charged. In this manner, the third and fourth rails 3, 4 can be completely covered by a train 1 when in use.

The third and fourth rails 3, 4 are connected to an electrical power supply, in this instance the energy storage apparatus 200 via a power control module 406. The third rail 3 is permanently at earth potential, and the fourth rail 4 can be selectively connected to the power supply by the power control module 406. This offers a DC charging current for the onboard train batteries.

The carriage 10 comprises a first electrical rail contact 402 and a second electrical rail contact 404. These contacts are in the form of shoes which are well known in the field of electric train design. The first shoe 402 is configured to make contact with the third rail 3 when the carriage 10 is in the charging zone CZ. The second shoe 404 is configured to make contact with the fourth rail 4 when the carriage 10 is in the charging zone CZ. The shoes 402, 404 are connected to charging terminals on the battery modules 26 on the train. In this way, the batteries in the modules 26 can be charged from the storage apparatus 200.

Figure 5:
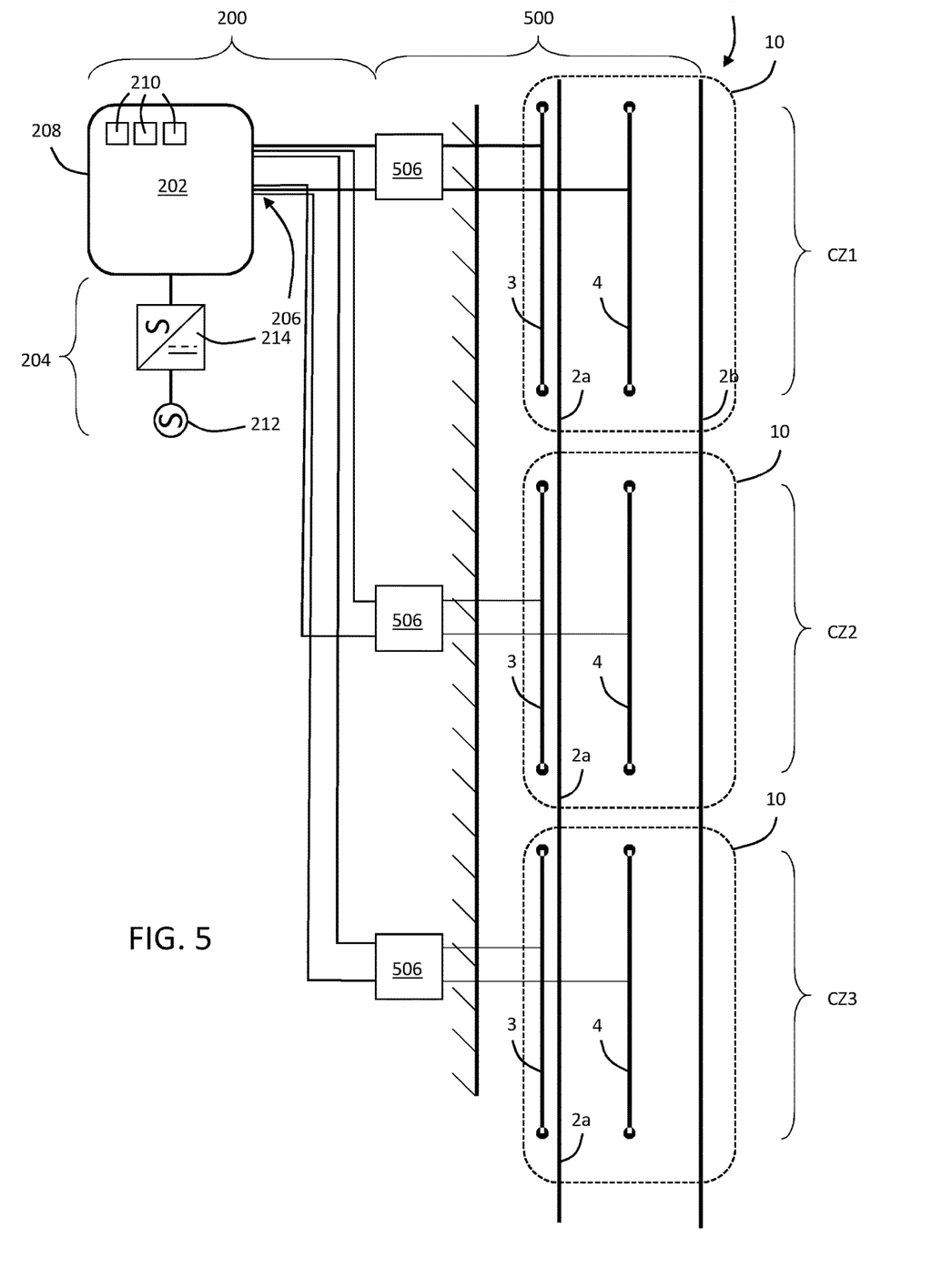
FIG. 5 is a schematic of a second rail transport vehicle electric energy storage and charging system.

Referring to FIG. 5, a further aspect of the disclosed embodiment of a charging system 500 according to the presently disclosed embodiment is shown. The charging system 500 comprises a third rail 3 and a fourth rail 4, but the rails are separated into three separate proximate but separate charging zones CZ1, CZ2, CZ3. One or more charging zones CZ1, CZ2, CZ3 can be covered by an individual carriage 10 of a train 1. Each charging zone has its own respective power control module 506 which can selectively power the charging rail in each of the zones. Each third rail 3 is permanently at earth potential, and each fourth rail 4 can be selectively connected to the power supply by its respective power control module 506.

Each carriage 10 comprises a first electrical rail contact and a second electrical rail contact (not shown) in the form of shoes as shown in FIG. 4 (i.e., shoes 402, 404).

Each charging zone CZ1 etc is individually interlocked. In other words, in order to allow the charging current to be delivered to the charging rail in the relevant zone, the relevant power control module 506 needs to be satisfied that a train carriage is in position.

This facilitates the charging system being provided to charge (in this example) up to three carriages 10. The system can also charge one or two carriages as required by the length of the train 1. For example, a single carriage 10 in zone CZ1 can be charged without the fourth rail 4 being live in either of the other zones CZ2, CZ3.

Figure 6A:
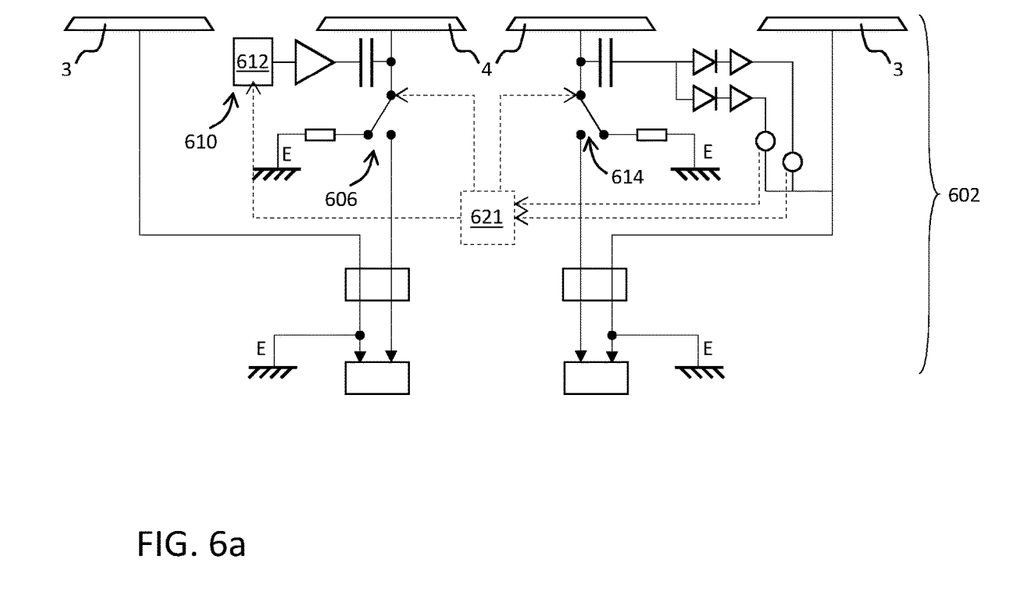
FIGS. 6a to 6c are schematics of a first charging interlock system in accordance with aspects of the disclosed embodiment.
Figure 6B:
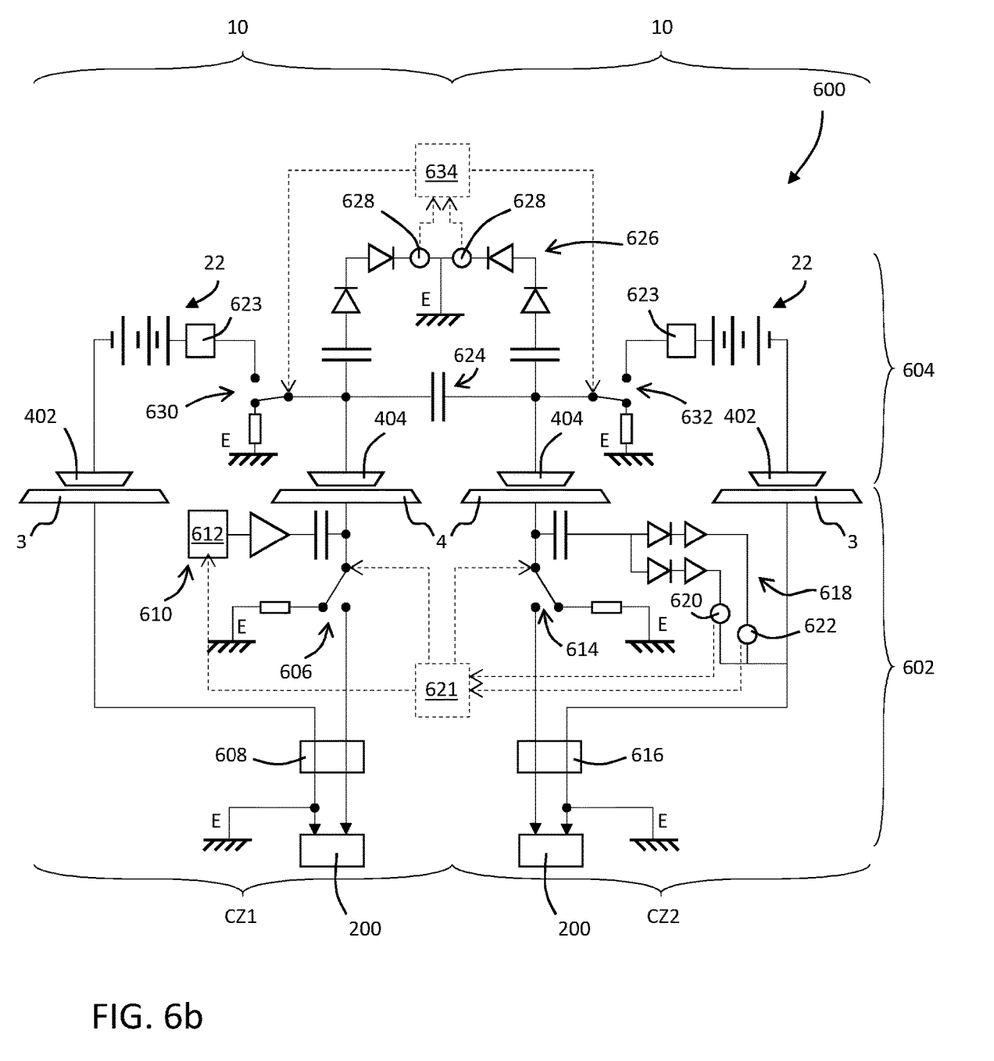
Figure 6C:
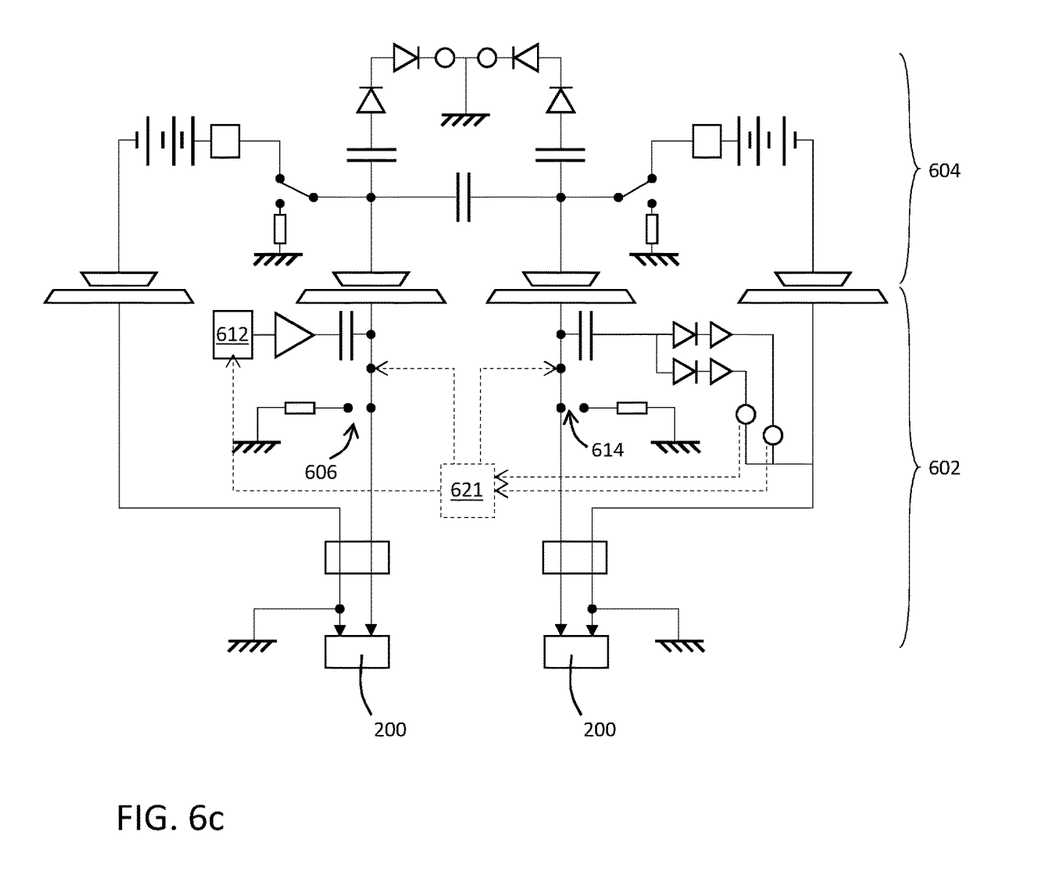

It will be understood that in either of the charging systems 400, 500 described above, it is not permitted for the fourth rail(s) 4 to become live (at least to a degree which would pose a danger) when exposed—i.e. when a train is not present. The presently disclosed embodiment comprises a series of interlocks to ensure that the fourth rail 4 is only made live when a train is present and set to the appropriate state to receive charging power, and thus manual access to the fourth rail 4 is prevented. The interlocks are as follows. It will be understood that each of these alone, or in combination could be employed with either aspect as described above:

FIGS. 6a to 6c show schematics of a first electrical interlock system 600 in various stages of operation. The first electrical interlock system 600 has a rail side sub-system 602 and a vehicle side sub system 604.

The rail side sub-system 602 comprises two sections of fourth, or "live" rail 4 in two charging zones CZ1, CZ2 (refer to e.g. FIG. 5 for further explanation of the charging zones). It will be noted that FIGS. 6a to 6c are schematic, and that the lengths of third rail 3 and fourth rail 4 will, in fact, be aligned per FIG. 5. The rail side sub-system is 602 is connected to the terminals of the energy storage apparatus 200 (or other energy supply).

The live terminal of the energy storage apparatus 200 is connected via a first rail side power switch 606 to the section of fourth rail 4 in CZ1. The first rail side power switch 606 can alternately connect the CZ1 section of fourth rail 4 to the live terminal of the energy storage apparatus 200 or to earth potential E. The neutral terminal of the energy storage apparatus 200 is connected to the CZ1 section of third rail 3. The neutral terminal is connected to earth potential E.

A first series control/protect device 608 is provided downstream of the energy storage apparatus 200. It will be noted that the connection between the neutral terminal of the power supply 200 and earth is provided between the device 608 and the power supply 200.

The rail side sub-system 602 further comprises a signal generator circuit 610 connected to the first charging zone CZ1 portion of the fourth rail 4. The signal generator circuit 610 comprises an oscillator 612 that is configured to alternately produce a high frequency (HF) and low frequency (LF) AC pilot signal.

The live terminal of the energy storage apparatus 200 is also connected via a second rail side power switch 614 to the section of fourth rail 4 in CZ2. The second rail side power switch 614 can alternately connect the CZ2 section of fourth rail 4 to the live terminal of the energy storage apparatus 200 or to earth potential E. The neutral terminal of the energy storage apparatus 200 is connected to the CZ2 section of third rail 3. The neutral terminal is connected to earth potential E.

A second series control/protect device 616 is provided downstream of the energy storage apparatus 200. It will be noted that the connection between the neutral terminal of the power supply 200 and earth is provided between the device 616 and the power supply 200.

The rail side sub-system 602 further comprises a rail side detection circuit 618 connected to the second charging zone CZ2 portion of the fourth rail 4. The rail side detection circuit 618 comprises a low frequency (LF) sensor 620 and a high frequency (HF) sensor 622.

The rail side sub-system 602 comprises a rail side controller 621. The controller 621 is configured to receive data signals from the rail side detection circuit 618 (specifically the low frequency (LF) sensor 620 and the high frequency (HF) sensor 622) and to provide output control signals to the oscillator 612 and rail side power switches 606, 614 as will be described below.

The vehicle side sub-system 604 is provided on two carriages 10. Each carriage 10 comprises a train shoe 402 for contact with the third rail 3 and a train shoe 404 for contact with the fourth rail 4. Each train carriage 10 is configured to occupy a different charging zone CZ1, CZ2.

In an exemplary embodiment and as shown in FIG. 6b, each carriage 10 may comprise a chargeable power module 22 having a series charge control device 623. The third rail connection shoes 402 are connected to the power module 22.

The fourth rail connection shoes 404 are connected by a link capacitor 624. Each of the fourth rail connection shoes 404 are also connected to a vehicle side detection circuit 626 comprising a low frequency (LF) sensor 628 for each shoe. The fourth rail connection shoes 404 are also connected to a first and second vehicle side power switch 630, 632 respectively. The power switches are configured to alternately connect the shoes 404 to earth potential E, or the positive terminal of the power module 22.

The vehicle side sub-system 604 comprises a vehicle side controller 634. The controller 634 is configured to receive data signals from the vehicle side detection circuit 626 and to provide output control signals to the vehicle side power switches 630, 632 as will be described below.

With continued reference to FIGS. 6a-6c, the first electrical interlock system 600 operates as follows. FIG. 6a shows the system in a condition where no railway vehicle is present. The fourth rail sections 4 in both charging zones CZ1, CZ2 are at earth potential due to the positions of the power switches 606, 614 connecting them to earth E. Therefore, the exposed rails are safe. The oscillator 612 produces a low frequency (LF) pilot signal in this condition.

FIG. 6b shows the railway vehicle has moved into position. The vehicle's shoes 402, 404 contact each of the rails 3, 4. As contact is made, the low frequency signal is able to pass through the link capacitor 624 between the fourth rail sections 4 in the charging zones CZ1, CZ2 and can therefore be detected by the LF sensor 620 in the rail side detection circuit 618.

Upon detection, the rail side controller 621 switches the rail side power switches 606, 614 to connect the power source 200 to the fourth rail sections 4. This is shown in FIG. 6c. The rail side controller 621 also instructs the oscillator 612 to switch from a low frequency (LF) to a high frequency (HF) pilot signal.

The high frequency (HF) signal is detected by the high frequency sensors 628 in the vehicle side detection circuit 626. The vehicle side controller 634, receiving this input then switches the vehicle side power switches 630, 632 such that the shoes 404 in contact with the fourth rail sections 4 are now in contact with the energy storage 22. There is now a charging circuit from the chargers 200 through to the vehicle batteries 22.

It will be noted that the rail side detection circuit 618 is configured to requires a pilot signal at all times (either high or low frequency) else the rail side controller 621 will switch the rail side power switches back to earth potential E. In this way, movement of the vehicle causing a drop in contact between the shoes and rail will automatically cut the power to the live rail sections.

According to an aspect of the disclosed embodiment of the interlock, a "handshake" system is proposed. Each power source (e.g. power control module 506) is provided with a digital electronic handshake module, which is configured to broadcast a low power "address" signal to the relevant section of connected fourth rail 4. The module is also configured to detect such low power address signals and to activate the charging current from the power control module 506 upon recognition of a predetermined response.

Each train carriage is also provided with a digital electronic handshake module, which is configured to detect low power address signals and to send a low power response signal to the relevant section of connected fourth rail 4 upon recognition of a predetermined address. The signals are passed through the contacts/shoes 404. In an aspect, each power control module 506 and contact 404 has a unique "address" signal. Each charger address (which is unique to each of the charging modules) is "broadcast" to the relevant section of fourth rail 4 at all times by the charger digital electronic handshake module.

Once a shoe contacts the relevant section of rail 4, the train module detects the charger address. If the charger address matches the expected address, the electronic handshake module broadcasts the contact address back to the rail section.

If the digital electronic handshake module reads the correct contact/shoe address from the train, charging is initiated. Only once the train is in position with each carriage contacting the correct fourth rail section, are the sections made "live" and charging is initiated, As the train arrives there would of course be a period when the chargers would be issuing their addresses and getting either no response or a false response. In these circumstances there is no charging current, and the fourth rail sections 4 are earthed. Only when all of the chargers are "talking" to their correctly numbered contact/shoe does the system know the train is in the correct position and thus enables charging.

The system checks that the earth connection made by the shoe 402 connecting the third rail 3 is made and proved to be satisfactory.

In an aspect, a train motion detector is provided which is configured to interrupt power to the fourth rail upon movement of the train (which would risk exposure of the fourth rail 4). Motion detection can take many forms, as will be appreciated by those in the art, but by way of example:

A static sensor may be positioned proximate the railway line which is directed at the carriage 10. For example, a light-based (e.g. laser) motion sensor or a form of radio such as RFID, Bluetooth™ or Wi-Fi™.

A sensor may be positioned on the train carriage which can communicate with the control module 406 to inform that the train is moving. The sensor may be connected to the train's drive system, or may be e.g. an inertial device which can sense acceleration.

In an aspect, driver input detection may be provided by a sensor to detect any action by the driver to select power or release the brakes to disable the chargers and earth the fourth rail 4 and its shoes. The sensor would communicate with the control module 406 to interrupt the charging current to the fourth rail should the train start to move away.

In an aspect, when in motion all the shoes 402, 404 are held at earth potential eliminating the risk of electric shock to maintenance staff or passengers.

Figure 7A:
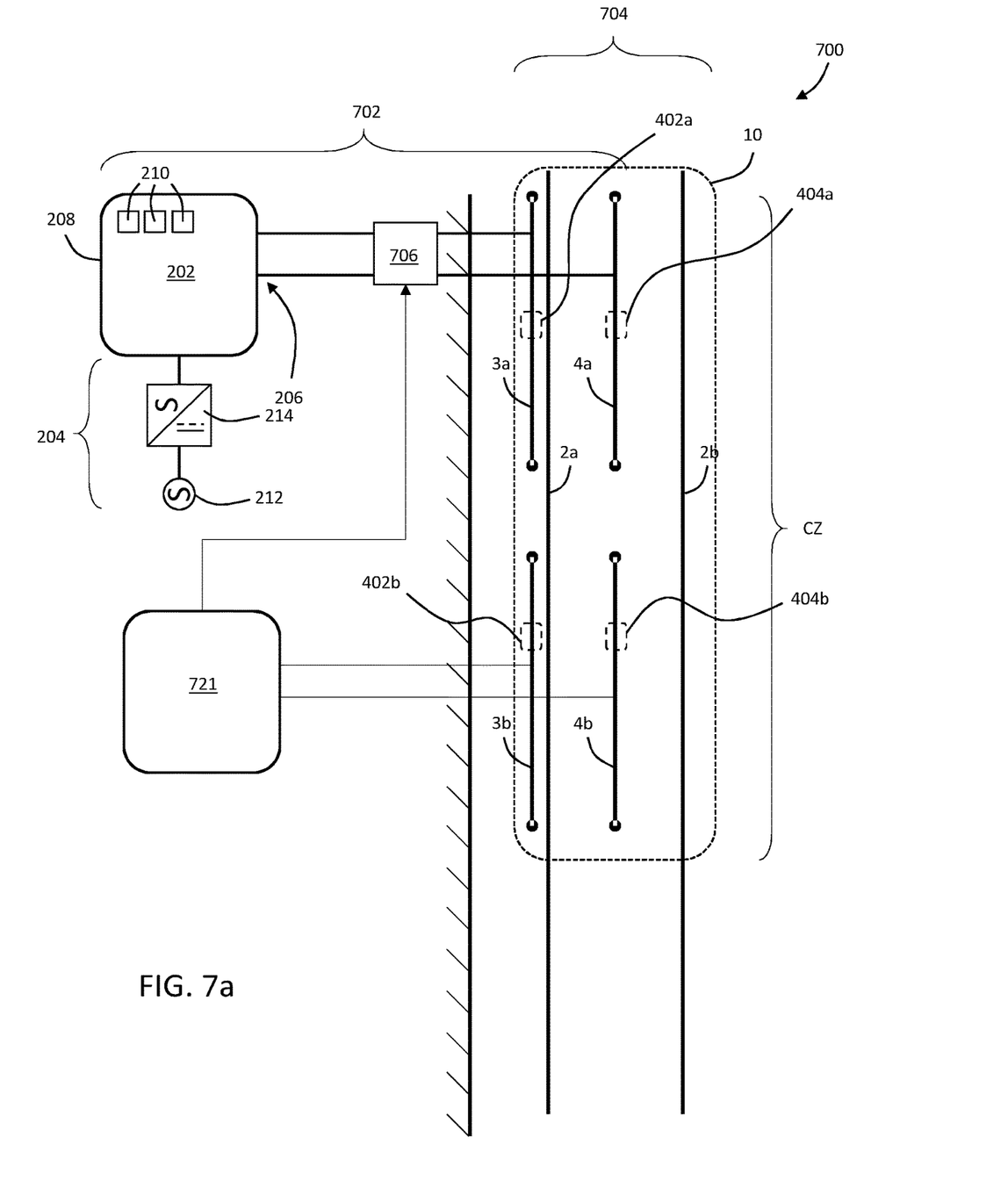
FIGS. 7a and 7b are schematics of a second charging interlock system in accordance with aspects of the disclosed embodiment.
Figure 7B:
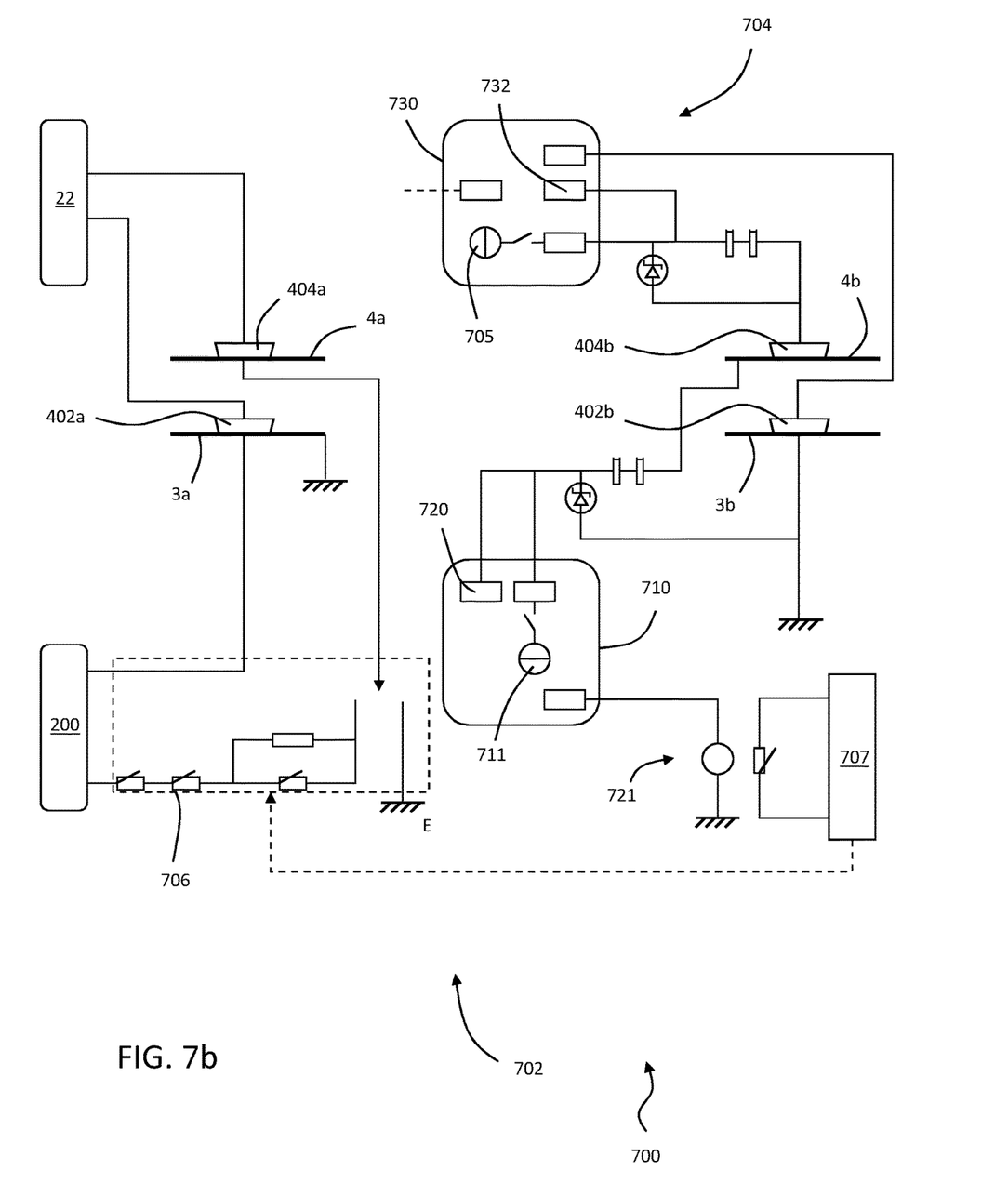

According to a further aspect of the disclosed embodiment of the interlock, an alternative "handshake" system is proposed. FIGS. 7*a* and 7*b* show schematics of the electrical interlock system 700 according to an embodiment.

The electrical interlock system 700 has a rail side sub-system 702 and a vehicle side sub system 704. The rail side sub-system 702 comprises a pair of power transfer rail sections 3*a*, 4*a* and a pair of interlock signal rail sections 3*b*, 4*b*. The sections 3*a*, 3*b* are in-line and the sections 4*a*, 4*b* are in-line (though this is not essential). The section 4*a*, 4*b* is a live rail. The pairs 3*a*, 4*a*, 3*b*, 4*b* are contained within a single charging zone CZ. One charging zone is provided for each carriage of the train which needs to be charged (although only one is shown in FIGS. 7*a* and 7*b*).

The rail side sub-system is 702 is connected to the terminals of the energy storage apparatus 200 (or other energy supply).

The live terminal of the energy storage apparatus 200 is connected via a rail side power switch 706 to the section of fourth rail 4*a* in the charging zone CZ. The rail side power switch 706 can alternately connect the charging zone CZ section of fourth rail 4*a* to the live terminal of the energy storage apparatus 200 or to earth potential E. The neutral terminal of the energy storage apparatus 200 is connected to the charging zone section of third rail 3*a*. The neutral terminal is connected to earth potential E.

The rail side sub-system 702 further comprises a rail side signal generator and detection circuit 710 connected to the first charging zone CZ portion of the fourth rail 4*b*. The rail side signal generator and detection circuit 710 comprises a signal source in the form of an oscillator 711 that is configured to produce a pilot signal. The rail side signal generator and detection circuit 710 comprises a sensor 720.

The rail side sub-system 702 comprises a rail side controller 721. The controller 721 is configured to receive data signals from the rail side signal generator and detection circuit 710 (specifically the sensor 720) and to provide output control signals to the oscillator (not shown) and a PLC 707 which controls the rail side power switch 706, as will be described below.

The vehicle side sub-system 704 is provided on each carriage 10. Each carriage 10 comprises a first train shoe 402*a* for contact with the third rail section 3*a*, a second train shoe 402*b* for contact with the third rail section 3*b*, a first train shoe 404*a* for contact with the fourth rail section 4*a* and a second train shoe 404*b* for contact with the fourth rail section 4*b*. Each train carriage 10 is configured to occupy a different charging zone CZ.

Each carriage 10 comprises a chargeable power module 22 having a series charge control device (not shown). The third rail connection shoes 402*a*, 402*b* are connected to the power module 22.

The vehicle side sub-system 704 further comprises a vehicle side signal generator and detection circuit 730 comprising a signal source in the form of an oscillator 705, the circuit being connected to the first charging zone CZ portion of the fourth rail 4*b*. The vehicle side signal generator and detection circuit 730 comprises a sensor 732.

Operation of the electrical interlock system 700 will now be described with continued reference to FIGS. 7*a*-7*c*. The charging rails 4*a*, 4*b* are held at earth potential until the interlock is cleared in order to ensure that if a carriage 10 is not in the charging zone CZ, the charging rails 4*a*, 4*b* are not "live".

Upon arrival of the train at a charging station, the vehicle side signal generator and detection circuit 730 transmits a signal indicating that the carriage is present and that the train is active (for example the driver's key is in installed and/or the brakes are off). This signal is generally produced at all times—not only when the train arrives at a charging station. The signal is received by the rail side signal generator and detection circuit 710. The sensor 720 detects that the carriage is in position and the fact that the train is still active.

Upon removal of the driver's key and/or application of the brakes, a signal of a different frequency is transmitted by the vehicle side signal generator and detection circuit 730 to the rail side signal generator and detection circuit 710. In response, the rail side signal generator and detection circuit 710 transmits a signal at a further frequency.

The 'handshake' of this aspect of the disclosed embodiment includes the exchange of signals at specific frequencies between the vehicle side signal generator and detection circuit 730 and the rail side signal generator and detection circuit 710.

Upon completion of the 'handshake', a signal is transmitted from the rail side signal generator and detection circuit 710 to the vehicle side signal generator and detection circuit 730 via the PLC 707 to prepare the vehicle for charge. A signal is transmitted to the rail side power switch 706 from the PLC 707 to commence charging. The 'handshake' continues throughout charging. Charging is continued as long as the 'handshake' is successfully completed and the driver's key remains out and/or the brakes are applied.

Upon re-insertion of the driver's key, a change in the frequency of the transmitted signal is received by the rail side signal generator and detection circuit 730, the rail side power switch 706 is opened to disconnect the supply of power.

Although in the exemplary embodiment described above, the carriage 10 is described as having two pairs of shoes 402a, 402b, 404a, 404b, it will be understood that the carriage may have a single pair of shoes.

The presently disclosed embodiment is beneficial because existing railway carriages tend to have a "driver's key" signal sent throughout the entire train which can be utilised to provide the signal. Therefore no further wiring between carriages is required.

Although in the aspect described above, the rail side sub-system 702 is described as comprising two sections of fourth, or "live" rail 4a, 4b and two sections of third rail 3a, 3b in a single charging zone CZ, it will be understood that the rail side sub-system 702 may have a single section of fourth, or "live" rail 4 and a single section of third rail 3 in a single charging zone CZ. In this aspect of the disclosed embodiment the interlock signal is overlaid on the power signal during charging.

It will be noted that according to a further aspect of the disclosed embodiment, a wheel sensor may be used in series with the interlock detection apparatus such that movement of the carriage out of position will also cease the charging operation. The sensor may be e.g. optical or magnetic.

Variations fall within the scope of the presently disclosed embodiments. The charging system 400 is configured to work with the energy storage apparatus 200, although it will be noted that the systems can be used independently. For example, the energy storage system 200 may be used with any other type of charging system, for example requiring a lead to be manually plugged into the train battery unit. The charging system 400 may be used with other power sources, such as electrical generators or mains power.

The battery array 200 may be charged by other means than the mains grid. For example, renewable energy generators may be installed on the container 208 and/or adjacent station to charge the array either alone or in combination with mains power. For example, solar panels may be installed, or wind turbines.

Instead of a third rail, the first and/or second rails may be at earth potential, and complete the charging circuit, although this is not preferred. As such, it would be possible to use the wheels, brush gear and running rail(s) as the earth path for charging, although this is not preferred. The system may be configured to provide AC to the railway vehicle instead of DC.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A rail transport vehicle charging system comprising:
   a charging rail dimensioned to be fully coverable by a train carriage;
   a power supply for charging an electric train battery, the power supply being configured to selectively supply a charging current to the charging rail;
   a sensor configured to detect at least one of the position and the movement of a train carriage over the charging rail,
   wherein the sensor is connected to the power supply such that the charging current is only supplied to the charging rail when the train carriage at least partially covers the charging rail;
   a driver input sensor configured to:
   detect input from a driver of the rail transport vehicle to select vehicle power or to release vehicle brakes; and
   responsive to detecting the input, end supply of the charging current to the charging rail; and
   a digital electronic handshake module configured to:
   responsive to receiving a broadcast address, transmit a response;
   wherein the charging current is only supplied to the charging rail when the response has been received by the power supply.

2. The rail transport vehicle charging system of claim 1, wherein the charging current is only supplied to the charging rail when the train carriage fully covers the charging rail.

3. The rail transport vehicle charging system of claim 2, wherein the sensor is further configured to detect a circuit being made with the charging rail, and to apply the charging current upon detection of the circuit being made.

4. The rail transport vehicle charging system of claim 3, wherein, when as sensing electrical potential is applied to the charging rail, the sensor is further configured to detect a sensing current flowing as a result of the sensing electrical potential.

5. The rail transport vehicle charging system of claim 4, wherein the sensing current is AC and the charging current is DC.

6. The rail transport vehicle charging system of claim 1, wherein the sensor is configured to detect the presence of a train carriage over the charging rail.

7. The rail transport vehicle charging system of claim 6, wherein the sensor is an electromagnetic sensor.

8. The rail transport vehicle charging system of claim 1, further comprising a plurality of discrete charging rails configured to simultaneously charge a plurality of train carriages.

9. The rail transport vehicle charging system of claim 8, wherein each discrete charging rail comprises a respective each of the sensors, and wherein each of the sensors is connected to a power supply such that the charging current is only supplied to the respective charging rail when a respective train carriage at least partially covers the respective charging rail.

10. The rail transport vehicle charging system of claim 9, wherein the power supply is common to the plurality of charging rails.

11. The rail transport vehicle charging system of claim 1, wherein the charging rail is positioned between two running rails.

12. The rail transport vehicle charging system of claim 1, comprising a second charging rail configured to make the charging circuit with the charging rail.

13. The rail transport vehicle charging system of claim 12, wherein the second charging rail is connected to earth potential.

14. The rail transport vehicle charging system of claim 13, wherein the second charging rail is positioned outside of the running rails.

15. A rail transport vehicle charging system, comprising:
    a charging rail;
    a rail transport vehicle comprising a train carriage, an on-board battery, and an electrical contact for contact with the charging rail;
    a power supply for charging the on-board battery, the power supply being configured to selectively supply a charging current to the charging rail;
    a sensor positioned on one of the charging rail and the rail transport vehicle and configured to detect at least one of the position and the movement of the rail transport vehicle over the charging rail,
    wherein the sensor is connected to the power supply such that the charging current is only supplied to the charging rail when the rail transport vehicle at least partially overs the charging rail;
    a driver input sensor configured to:
    detect input from a driver of the rail transport vehicle to select vehicle power or to release vehicle brakes; and
    responsive to detecting the input, end supply of the charging current to the charging rail; and
    a digital electronic handshake module configured to:
    responsive to receiving a broadcast address, transmit a response;
    wherein the charging current is only supplied to the charging rail when the response has been received by the power supply.

16. The rail transport vehicle charging system of claim 15, wherein the sensor is on-board the rail transport vehicle.

17. The rail transport vehicle charging system of claim 16, wherein the sensor is further configured to detect electrical connection between the electrical contact and the charging rail.

18. The rail transport vehicle charging system of claim 17, wherein the sensor is further configured to detect motion of the rail transport vehicle.

19. An electric rail transport vehicle comprising:
   an electric motor for propelling the vehicle;
   a battery arranged to power the electric motor;
   a rail contact electrode extending from the vehicle and configured to contact a rail, wherein the rail contact electrode is connected to the battery to provide a charging current from the rail to the battery in use;
   a driver input sensor configured to:
      detect input from a driver of the electric rail transport vehicle to select vehicle power or to release vehicle brakes; and
   responsive to detecting the input, end supply of the charging current; and
   a digital electronic handshake module configured to:
      responsive to receiving a broadcast address, transmit a response;
   wherein the charging current is only supplied to the charging rail when the response has been received by the power supply.

\* \* \* \* \*